US011735363B2

(12) United States Patent
Roth et al.

(10) Patent No.: US 11,735,363 B2
(45) Date of Patent: Aug. 22, 2023

(54) IN LEAD CAPACITOR

(71) Applicant: Franklin Electric Co., Inc., Fort Wayne, IN (US)

(72) Inventors: Robert A. Roth, Fort Wayne, IN (US); Russell J. Bookout, Fort Wayne, IN (US); Donald Brown, Fort Wayne, IN (US); Arron J. Foreman, Fort Wayne, IN (US); Jeffrey D. Frank, Fort Wayne, IN (US); Paul Luarde, Fort Wayne, IN (US); Mark E. McClain, Fort Wayne, IN (US)

(73) Assignee: FRANKLIN ELECTRIC CO., INC., Fort Wayne, IN (US)

( * ) Notice: Subject to any disclaimer, the term of this patent is extended or adjusted under 35 U.S.C. 154(b) by 630 days.

(21) Appl. No.: 16/689,638

(22) Filed: Nov. 20, 2019

(65) Prior Publication Data

US 2020/0161050 A1 May 21, 2020

Related U.S. Application Data

(60) Provisional application No. 62/770,621, filed on Nov. 21, 2018.

(51) Int. Cl.
*H01G 4/224* (2006.01)
*F04B 49/06* (2006.01)
*H02K 5/22* (2006.01)

(52) U.S. Cl.
CPC ............. *H01G 4/224* (2013.01); *F04B 49/06* (2013.01); *H02K 5/225* (2013.01)

(58) Field of Classification Search
CPC .......... H01G 4/224; F04B 49/06; H02K 5/225
See application file for complete search history.

(56) References Cited

U.S. PATENT DOCUMENTS

| 3,457,866 | A | * | 7/1969 | Komor ................. H02K 5/1285 310/68 R |
| 3,704,078 | A | | 11/1972 | Conery et al. |
| 4,297,627 | A | | 10/1981 | Schaefer |

(Continued)

FOREIGN PATENT DOCUMENTS

| CN | 202871582 U | * | 4/2013 |
| CN | 103440983 A | * | 12/2013 |

*Primary Examiner* — Livius R. Cazan
(74) *Attorney, Agent, or Firm* — Faegre Drinker Biddle & Reath LLP

(57) ABSTRACT

A capacitor assembly and a method of making the capacitor assembly. The capacitor assembly includes: a power cable including first and second electrical conductors; a motor cable including first, second, and third electrical conductors, the first electrical conductor of the motor cable electrically connected to the first electrical conductor of the power cable, and the second electrical conductor of the motor cable electrically connected to the second electrical conductor of the power cable; a capacitor connected to the first electrical conductors and to the third electrical conductor; and a cover enclosing the capacitor, ends of the first conductors of the power cable and the motor cable connected to the capacitor, and an end of the third conductor connected to the capacitor, the first connection, and the second connection, and wherein after installation the capacitor assembly has an arcuate shape with a concave surface facing the pipe.

16 Claims, 10 Drawing Sheets

(56) References Cited

U.S. PATENT DOCUMENTS

| | | |
|---|---|---|
| 4,546,300 A | 10/1985 | Shaikh |
| 6,359,353 B1 | 3/2002 | Bevington |
| 7,091,638 B2 | 8/2006 | Bevington |
| 7,215,051 B2 | 5/2007 | Neri |
| 2017/0324299 A1* | 11/2017 | Sinico ............... H02K 5/08 |

* cited by examiner

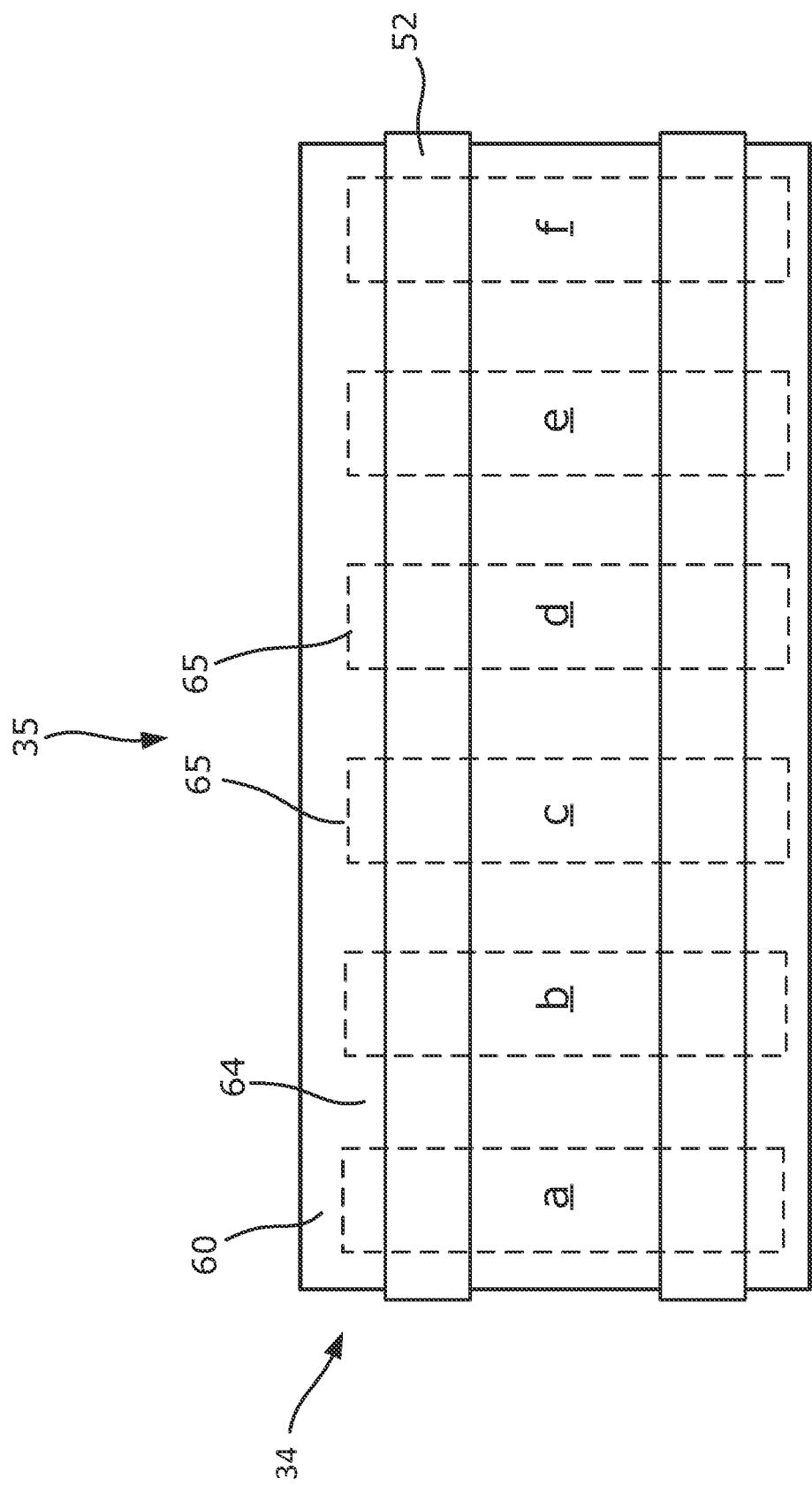

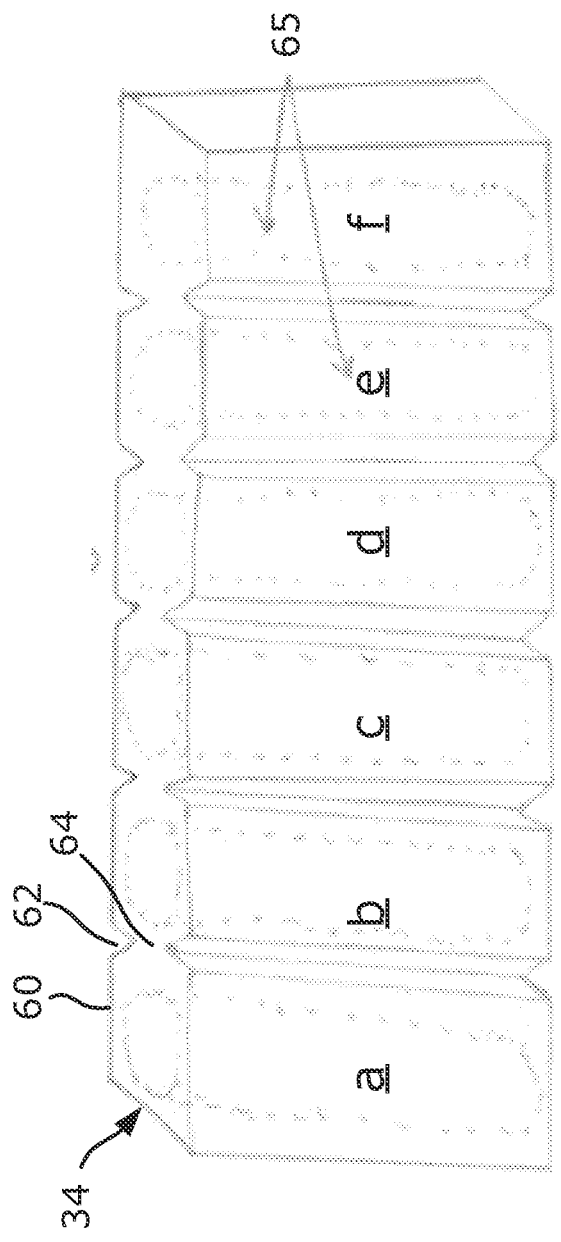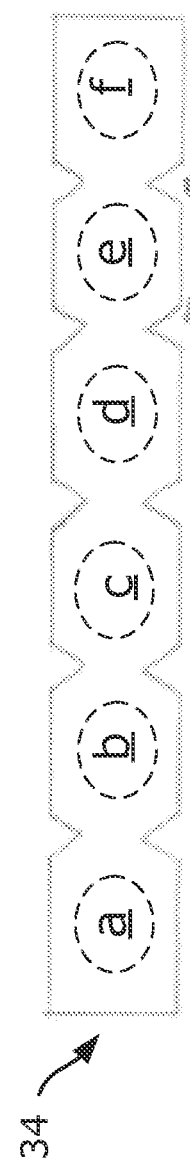

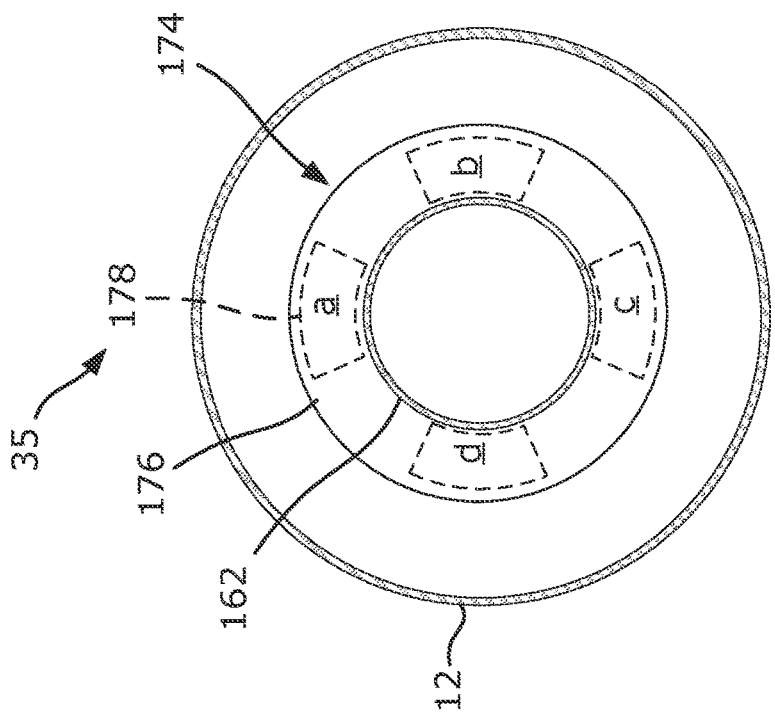
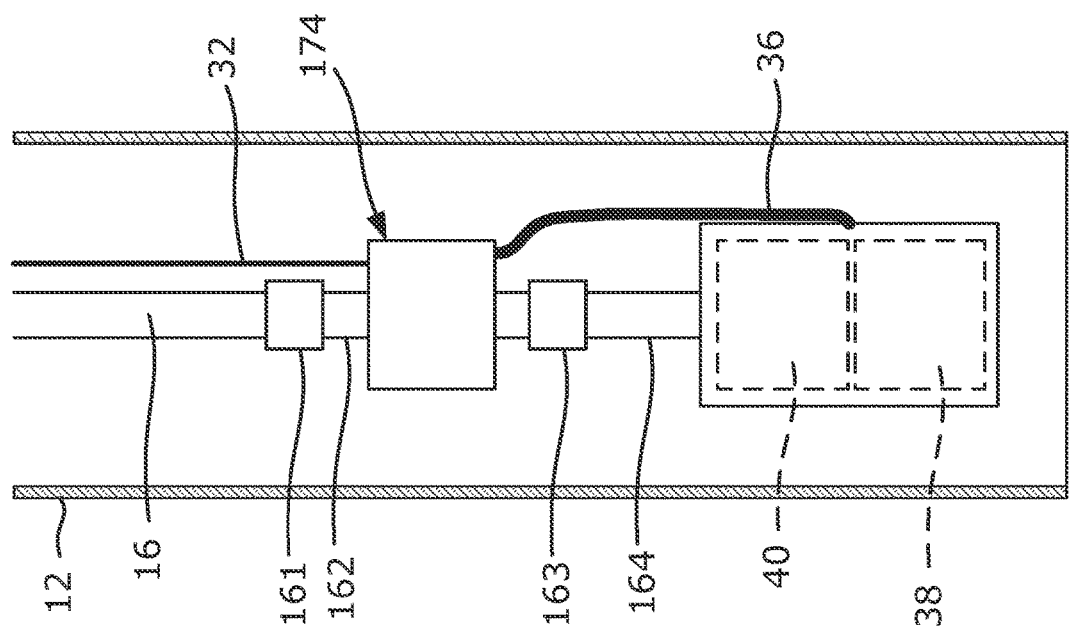

IN LEAD CAPACITOR

CROSS-REFERENCE TO RELATED APPLICATIONS

The present application claims the benefit of commonly-owned U.S. Prov. Patent Application No. 62/770,621, filed Nov. 21, 2018, which is incorporated herein by reference in its entirety.

FIELD OF THE DISCLOSURE

A capacitor adapted to fit around a drop pipe fluidly connected to a pump of a pump-motor assembly, and methods of making and using the capacitor with the pump-motor assembly.

BACKGROUND OF THE DISCLOSURE

Fluid pumping systems use motor drives to drive motors and pumps and transfer fluids. Fluids include liquids and gases, such as air. Fluid pumping systems are used in water wells, to extract liquids and gases from the earth, to boost pressures in pipelines, to transfer air and cooling liquids in HVAC systems, and in many other applications.

Motor drives may comprise variable frequency drives and other types of drives. Generally, an input voltage is provided to the motor drive and the motor drive converts the input voltage to a motor voltage to control the speed of the motor. In a variable frequency drive a typical input voltage is a constant frequency AC voltage, which is converted to DC voltage and the DC voltage is inverted to variable frequency AC voltage.

Motors with three-wire connections may be connected to a motor drive with or without a start capacitor. Improvements are desirable to increase flexibility during installation using a common motor design in a variety of electrical connection configurations.

SUMMARY

A capacitor assembly and a method of making the capacitor assembly are provided. In some embodiments, the capacitor assembly comprises: a power cable comprising a first electrical conductor and a second electrical conductor; a motor cable comprising a first electrical conductor, a second electrical conductor, and a third electrical conductor; the first electrical conductor of the motor cable connected to the first electrical conductor of the power cable at a first connection, and the second electrical conductor of the power cable electrically connected to the motor; a capacitor having a power electrical end and a motor electrical end, the power electrical end connected to the first electrical conductors of the power cable and the motor cable at the first connection, and the motor electrical end connected to the third electrical conductor at a second connection; and a cover enclosing the capacitor, the first connection, and the second connection, wherein after installation the capacitor assembly has an arcuate shape and a length in the direction of the pipe.

In another embodiment, the capacitor assembly comprises: a power cable comprising a first electrical conductor and a second electrical conductor; a motor cable comprising a first electrical conductor, a second electrical conductor, and a third electrical conductor, the first electrical conductor of the motor cable electrically connected to the first electrical conductor of the power cable, and the second electrical conductor of the motor cable electrically connected to the second electrical conductor of the power cable; a capacitor connected to the first electrical conductors of the power cable and the motor cable and to the third electrical conductor; and a cover enclosing the capacitor, ends of the first conductors of the power cable and the motor cable connected to the capacitor, and an end of the third conductor connected to the capacitor, wherein after installation the capacitor assembly has an arcuate shape with a concave surface facing the pipe. The cover is water impermeable, and the capacitor assembly is configured for installation outside the motor.

In some embodiments, the capacitor assembly capacitor sections encapsulated by the cover, wherein the cover is sized and configured to curve around the pipe thereby adopting the arcuate shape.

In some embodiments, the capacitor sections have lengths parallel to the length of the capacitor.

In some embodiments, a maximum thickness of the capacitor along a radial direction is at most 1.35 inches.

In some embodiments, the capacitor assembly further comprises a strap, wherein the cover includes two protrusions defining a space between them provided to enable securement of the capacitor assembly around the pipe with the strap, and wherein the strap overlaps the space between the two protrusions.

In some embodiments, the cover includes two protrusions defining a space between them provided to enable securement of the capacitor assembly around the pipe with the strap, and wherein the strap overlaps the space between the two protrusions, wherein the two protrusions extend from an outer surface of the cover and have elongate shapes extending perpendicularly to the length.

In some embodiments, the capacitor assembly further comprises a strap provided to enable securement of the capacitor assembly around the pipe with the strap, and at least a portion of the strap is integrally formed in one-piece with the cover. A fastener attached to the at least the portion of the strap integrally formed in one-piece with the cover may be provided.

Embodiments of a method of installing a pump are also provided. In one embodiment, the method comprises providing the capacitor assembly comprises: a power cable comprising a first electrical conductor and a second electrical conductor; a motor cable comprising a first electrical conductor, a second electrical conductor, and a third electrical conductor; the first electrical conductor of the motor cable connected to the first electrical conductor of the power cable at a first connection, and the second electrical conductor of the power cable electrically connected to the motor; a capacitor having a power electrical end and a motor electrical end, the power electrical end connected to the first electrical conductors of the power cable and the motor cable at the first connection, and the motor electrical end connected to the third electrical conductor at a second connection; and a cover enclosing the capacitor, the first connection, and the second connection, wherein after installation the capacitor assembly has an arcuate shape and a length in the direction of the pipe. The method further comprises coupling a drop pipe to a discharge port of the pump; connecting a free end of the motor cable to a motor operably connected to the pump; strapping the capacitor assembly to the drop pipe; and after strapping the capacitor assembly, inserting the motor, the pump, and the capacitor assembly into a casing.

In some variations, the method comprises connecting a feed line to the power cable before inserting the motor, the pump, and the capacitor assembly into the casing.

In some embodiments, strapping the capacitor assembly to the drop pipe includes curving the capacitor assembly. Curving the capacitor assembly may comprise bending the capacitor assembly from a planar shape to a curved shape.

In some embodiments, a method of making a capacitor assembly is provided. In some embodiments, the method comprises: connecting a first electrical conductor of a motor cable to a first electrical conductor of a power cable at a first connection; connecting a second electrical conductor of the motor cable to a second electrical conductor of a power cable at a second connection; electrically connecting a first capacitor section to a second capacitor section; electrically connecting a lead of the first capacitor section to the first electrical conductor of the motor cable; electrically connecting a lead of the second capacitor section to the third electrical conductor of the motor cable; and enclosing the first capacitor section, the second capacitor section, the first connection and the second connection in a cover.

In some embodiments, the method of making a capacitor assembly comprises connecting a first electrical conductor of a motor cable and a first electrical conductor of a power cable to a capacitor; connecting a third conductor of the motor cable to the capacitor; and enclosing in a cover: the capacitor, portions of the first electrical conductors of the motor cable and the power cable connected to the capacitor, and a portion of the third electrical conductor of the motor cable connected to the capacitor.

In some embodiments, the method further comprises electrically connecting additional capacitor sections to the first capacitor section and enclosing the additional capacitor sections with the cover.

DESCRIPTION OF THE DRAWINGS

The features and advantages of the disclosure will become more readily appreciated as the same become better understood by reference to the following detailed description when taken in conjunction with the accompanying drawings, where:

FIG. 4 is a plan view of the embodiment of the capacitor assembly of FIG. 1;

FIGS. 6-8 are perspective and elevation views of another, more generic, embodiment of a capacitor assembly;

FIGS. 11 and 12 are sectioned plan and elevation views of further embodiments of components of the liquid supply system of FIG. 1.

Figure 1:
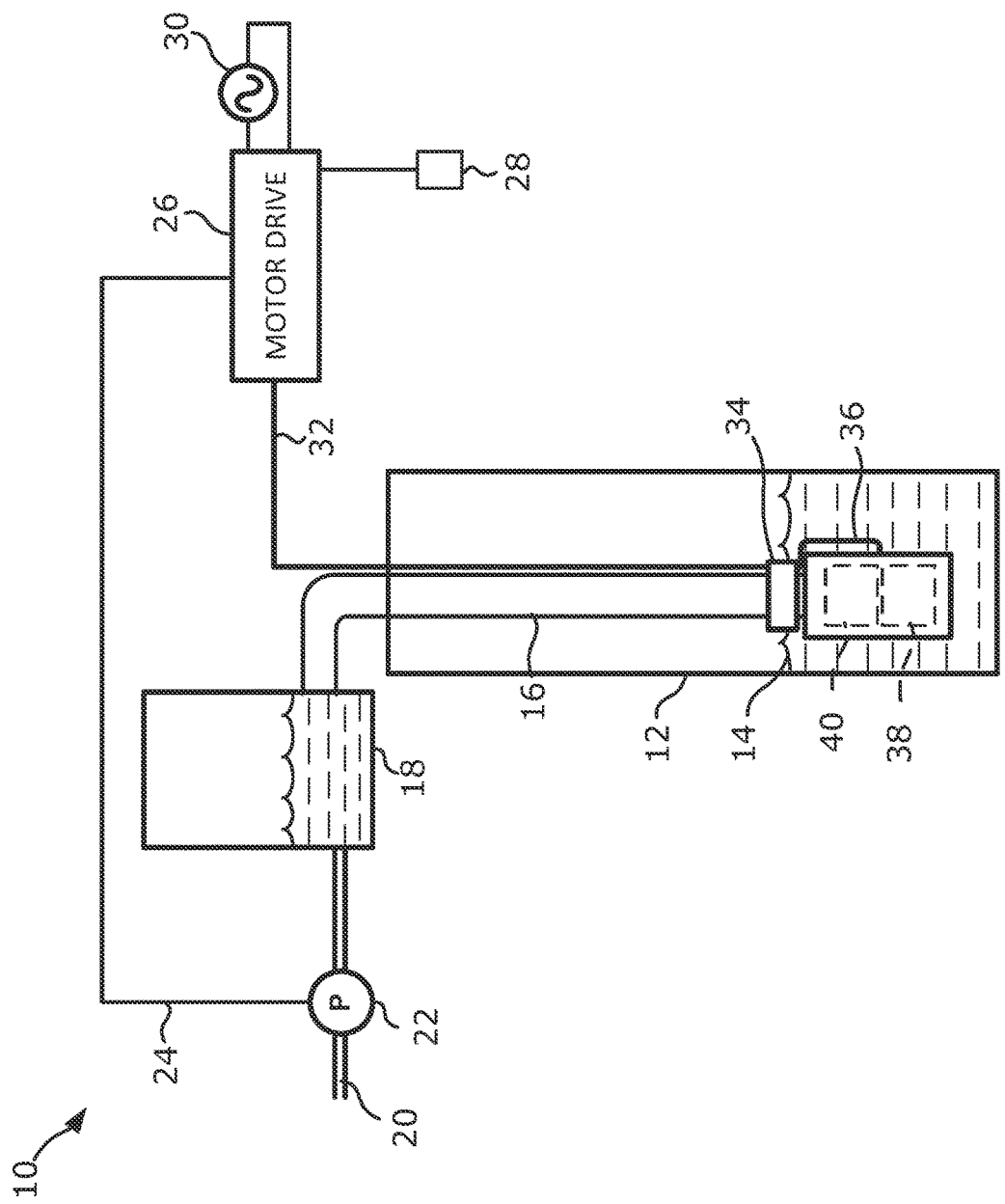
FIG. 1 is a diagrammatic view of a liquid supply system including embodiments of a motor and a capacitor assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION

For the purposes of promoting an understanding of the principles of the invention, reference will now be made to the embodiments illustrated in the drawings, which are described below. The embodiments disclosed herein are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended.

The present disclosure provides an efficient way to connect a capacitor between a feed line and a motor. The capacitor includes a portion of the lead line and a 3-conductor cable that is connectable to the motor. Advantageously, placing the capacitor near the motor reduces the length of 3-conductor cable that is required. Additionally, placing the capacitor near but outside the motor housing maintains the capacitor at a cooler temperature than if the capacitor is near the motor windings, thus increasing its life.

Referring to FIG. 1, a diagrammatic representation of a liquid supply system 10 is disclosed. Example liquids include water, gasoline fuel, diesel fuel, petroleum, oil, sewage, and combinations of such liquids with gases and solids, such as water and coal-based methane gas. Although the embodiments below may be described with reference to water, the invention is not so limited and the principles and advantages thereof may be applicable to any liquid. Liquid supply system 10 comprises a casing 12 containing water 14 which is pumped through a drop pipe 16, optionally to a reservoir 18, e.g. a pressure tank, and a conduit 20 delivering water for consumption. During operation of the system, water 14 flows out of conduit 20. For example, the system may be a water system in a home, in which case water flows out of conduit 20 when a faucet is opened or an irrigation system is turned on. Constant pressure ensures the heads of the irrigation system spray at a constant distance from the head to provide even and predictable irrigation. Fluid characteristics including pressure may be monitored with a pressure sensor 22 disposed in conduit 20 to generate a pressure signal useful to maintain pressure about a setpoint. The pressure signal is provided via line 24 connecting pressure sensor 22 and a motor drive 26. In one example, motor drive 26 is a variable frequency drive (VFD) which converts constant frequency AC voltage to a variable frequency AC voltage to control the speed of a motor 38. In another example, motor drive 26 is a contactor or relay suitable to turn a constant frequency supply on and off. Casing 12 may be an aboveground or underground tank, a well casing, or any other reservoir containing water 14. An AC power source 30 provides the constant frequency AC voltage to motor drive 26, which is connected to a capacitor assembly 34 by a cable 32, which is connected to a motor 38 by a cable 36. A pump 40 is mechanically connected to motor 38 and fluidly connected to drop pipe 16 to pump water therethrough. Motor 38 and pump 40 may be referred to as a pump-motor assembly.

Drop pipe outer diameters (O.D.) vary. In some examples, the O.D. is between 1-3 inches. In some examples, the I.D. of the casing is 4 inches or more, up to, e.g. 12 inches.

In the present embodiment, cable 32 has two wires and cable 36 has three wires, or one less than cable 32. Cables 32 and 36 are connected to capacitor assembly 34. The connections can be permanent or comprise mating plugs, therefore not permanent.

Figure 3:
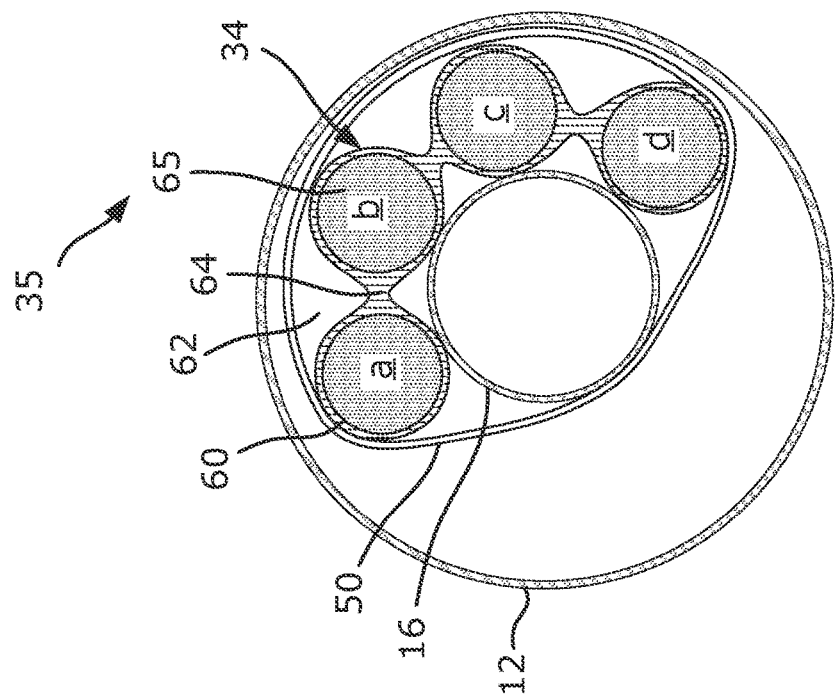
FIGS. 2 and 3 are sectioned plan and elevation views of embodiments of components of the liquid supply system of FIG. 1.
Figure 2:
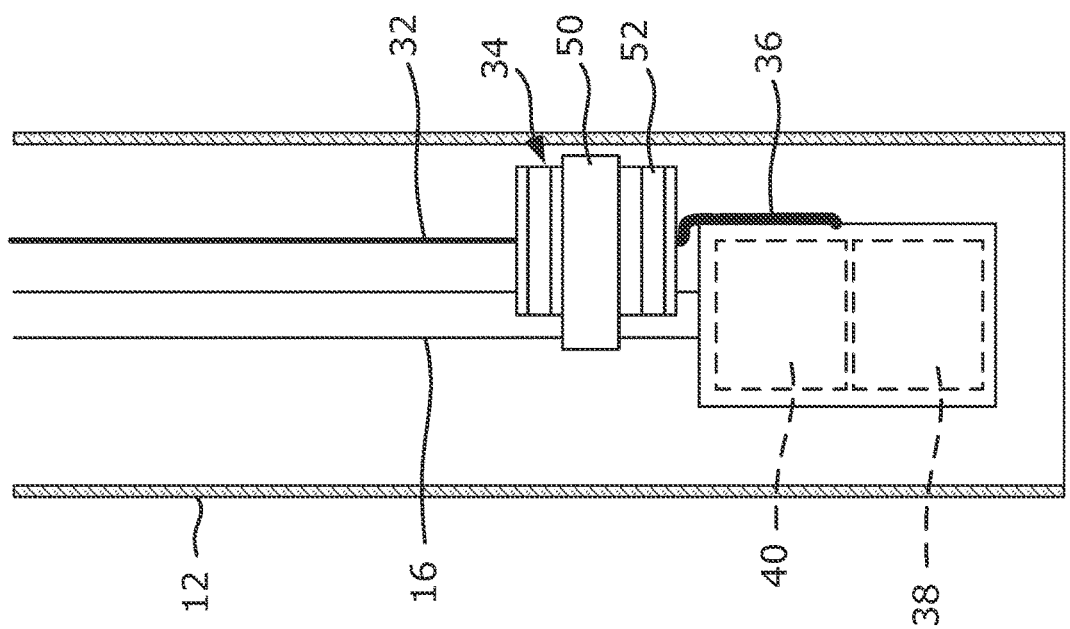

FIGS. 2 and 3 are sectioned plan and elevation views of components of liquid supply system 10. FIG. 4 is a plan view of capacitor assembly 34. FIG. 2 illustrates capacitor assembly 34, including a capacitor 35 (shown in FIGS. 3 and 10), secured to drop pipe 16 with a strap 50 that wraps around capacitor assembly 34 and drop pipe 16, also depicted in FIG. 3. In the present embodiment capacitor assembly 34 includes protrusions 52 extending from its outer surface, which are provided to ensure that strap 50 does not slide off the outer surface. The protrusions are shown in FIGS. 2 and 4 but not FIG. 3. As used herein, outer surface is the surface facing away from the drop pipe and inner surface is the surface facing the drop pipe. Examples of strap 50 include tape, tie-wraps, hook-n-loop textured belts, hose clamps, belts with buckles or other attachment/detachment mechanisms, pipe straps, and any other apparatus that can be wrapped to secure capacitor assembly 34 around drop pipe 16 to achieve the smallest cross-section of the assembly.

Capacitor assembly 34 includes a cover 60 that defines the inner and outer surfaces of capacitor assembly 34. As shown in FIG. 3, cover 60 contacts drop pipe 16 to reduce the cross-section of capacitor assembly 34 and drop pipe 16 when capacitor assembly 34 is strapped or secured to drop pipe 16.

In various embodiments capacitor assembly 34 is depicted showing capacitor sections 65, depicted as sections a-d or a-f, of capacitor 35. From an electrical viewpoint each section 65 is a capacitor and the sections are connected electrically to provide a desired capacitance to capacitor assembly 34, which capacitance is referred to as capacitor 35 and shown thus in FIG. 10. Clearly the number of sections depends on the desired capacitance to be achieved and can be as few as one and as many as will fit between the drop pipe and the casing. The capacitor sections can be connected to each other in series or parallel or combinations thereof to achieve the desired capacitance for a particular voltage and motor size. The capacitor sections are wrapped in cover 60 that surrounds each section and provides a flexible connector 64 between each pair of sections. A profile (cross-section) depression 62 is shown to illustrate that a thickness or radial width of a capacitor section is greater than the thickness of the flexible connector and provides space to enable wrapping of capacitor assembly 34 around drop pipe 16.

Figure 5:
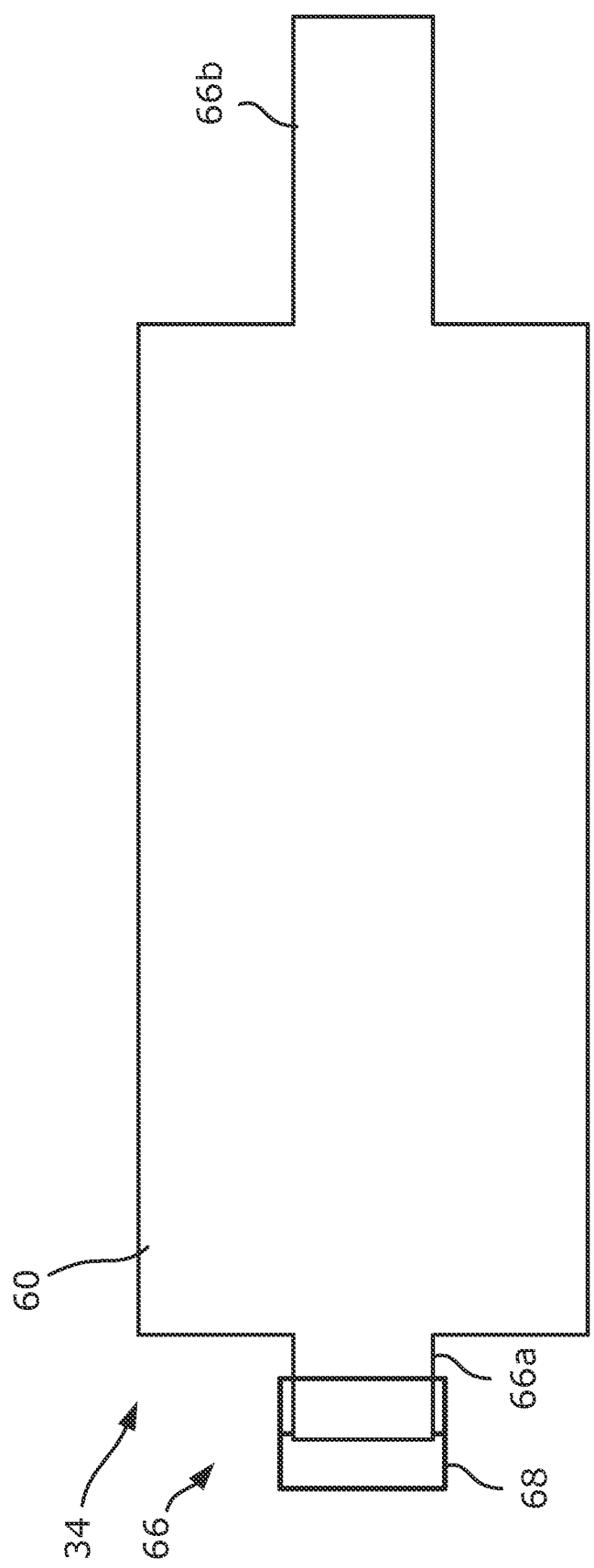
FIG. 5 is a plan view of a further embodiment of a capacitor assembly.

FIG. 5 is a plan view of a variation of the embodiment depicted in FIGS. 1-4. In this embodiment a strap 66 is built-in with the cover 60. As shown, the strap comprises strap portions 66a and 66b, which are narrow portions of material extending from cover 60, and a fastener 68. Strap portion 66b can be threaded through openings in fastener 68 and tightened to secure capacitor assembly 34 to the drop pipe. Example fasteners include hook-n-loop fasteners, buckles, clasps, etc. Capacitor sections 65 are present but not shown.

Figure 8:
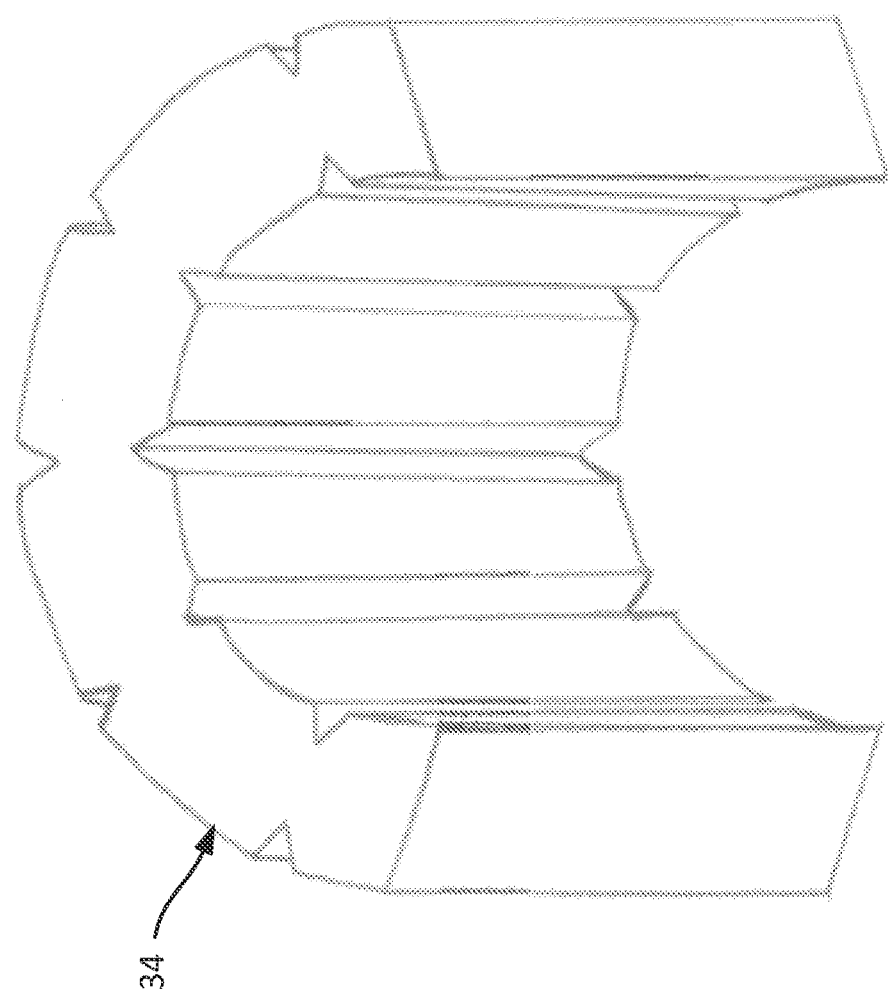

FIGS. 6-8 are perspective (flat), elevation, and perspective (curved) views of capacitor assembly 34. In the present embodiment capacitor assembly 34 includes sections a-f, each comprising capacitor sections 65 of capacitor 35. The capacitor sections can be connected to each other in series or parallel or combinations thereof to achieve the desired capacitance for a particular voltage and motor size. The capacitor sections are wrapped in cover 60 that surrounds each section and provides a flexible connector 64 between each pair of sections. The present embodiment is a variation of the embodiment depicted in FIG. 1, without surface protrusions to collar the strap in place. The capacitor assembly comprising a flexible cover, referred to as a conformable capacitor, can be shaped as shown in FIG. 8 to assume the arcuate shape. In a variation in which the cover is not flexible, the arcuate shape is formed during manufacturing and the capacitor is said to be nonconformable.

In some embodiments, a capacitor assembly comprises a power cable, or feed line, comprising a first electrical conductor and a second electrical conductor; a motor cable comprising a first electrical conductor, a second electrical conductor, and a third electrical conductor, the first electrical conductor of the motor cable connected to the first electrical conductor of the power cable at a first connection, and the second electrical conductor of the power cable electrically connected to the motor; a capacitor having a power electrical end and a motor electrical end, the power electrical end connected to the first electrical conductors of the power cable and the motor cable at the first connection, and the motor electrical end connected to the third electrical conductor at a second connection; and a cover enclosing the capacitor, the first connection, and the second connection, wherein after installation the capacitor assembly has an arcuate shape and a length in the direction of the pipe.

Figure 9:
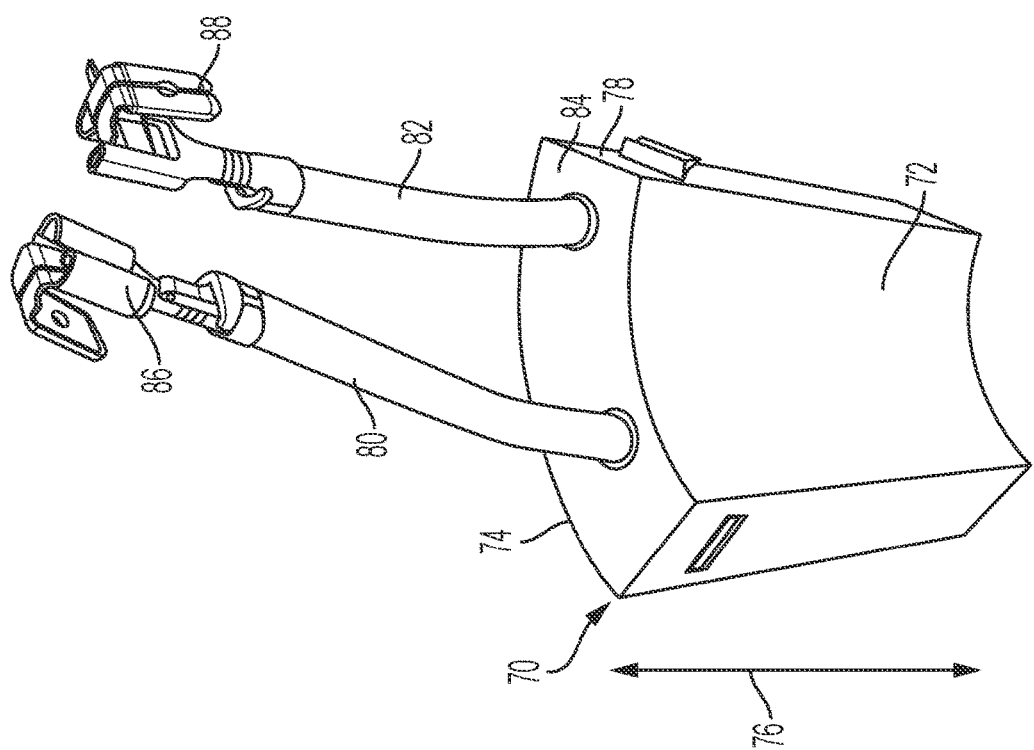
FIG. 9 is a perspective view of a capacitor.

FIG. 9 illustrates a component 70, without a cover, that can be used as capacitor 35 or as a section of capacitor 35. Component 70 has an inner, or concave, surface 72, an outer, or convex, surface 74, a length 76, and an enclosure, or housing, 78. The housing includes the concave and convex walls comprising the concave and convex surfaces, which can be parallel to each other, and left and right lateral walls connecting the concave and convex surfaces, thereby forming a volume into which potting material is introduced. Inside enclosure 78 are the layers that form the capacitance of the capacitor, e.g. polyester film and metal foil, which are connected to leads 80, 82, and are potted in potting material 84. Leads 80, 82 have connectors 86, 88 and comprise the power electrical end and motor electrical end of the capacitor. Although leads 80, 82 are shown extending from the top side of each section 65, leads 80, 82 preferably extend from the left and right sides of the housing to facilitate interconnection and enclosure of such connections with the cover.

In one variation of the present embodiment, component 70 is used as a capacitor 35, connector 86 is connected to the first electrical conductor of the motor cable and to the first electrical conductor of the power cable at the first connection. Connector 88 can be connected to the third electrical conductor of the motor cable at the second connection. Both connections and enclosed by the cover. The second electrical conductor of the power cable is electrically connected to the motor, either directly or via a third connection made to the second electrical conductor of the motor cable. The third connection would also be enclosed by the cover.

In another variation of the present embodiment, component 70 is used as a section 65 of capacitor 35, connector 86 is connected to the first electrical conductor of the motor cable and connector 88 is connected to a connector 86 of another section. In this manner the sections can be daisy-chained and the connector 88 of the last section is connected to the third electrical conductor of the motor cable at the second connection. Alternatively, connectors 86 and 88 can be connected in parallel or combinations of parallel and series arrangements.

Component 70 has an arcuate shape with an arc defined by an angle less than 235 degrees, also less than 200 degrees, and less than 180 degrees. A 180 degree arc with a radius equal to the radius of the drop pipe would allow the arcuate surface to match the periphery of the pipe. If the radii are the same and the angle is more than 180 degrees, the pipe will not pass between the ends of the component. However if the radius of the component is greater, then an angle greater than 180 degrees will not prevent the pipe from passing through the gap formed by the ends of the component. The same geometric limitations apply to an inflexible multi-section capacitor.

Figure 10:
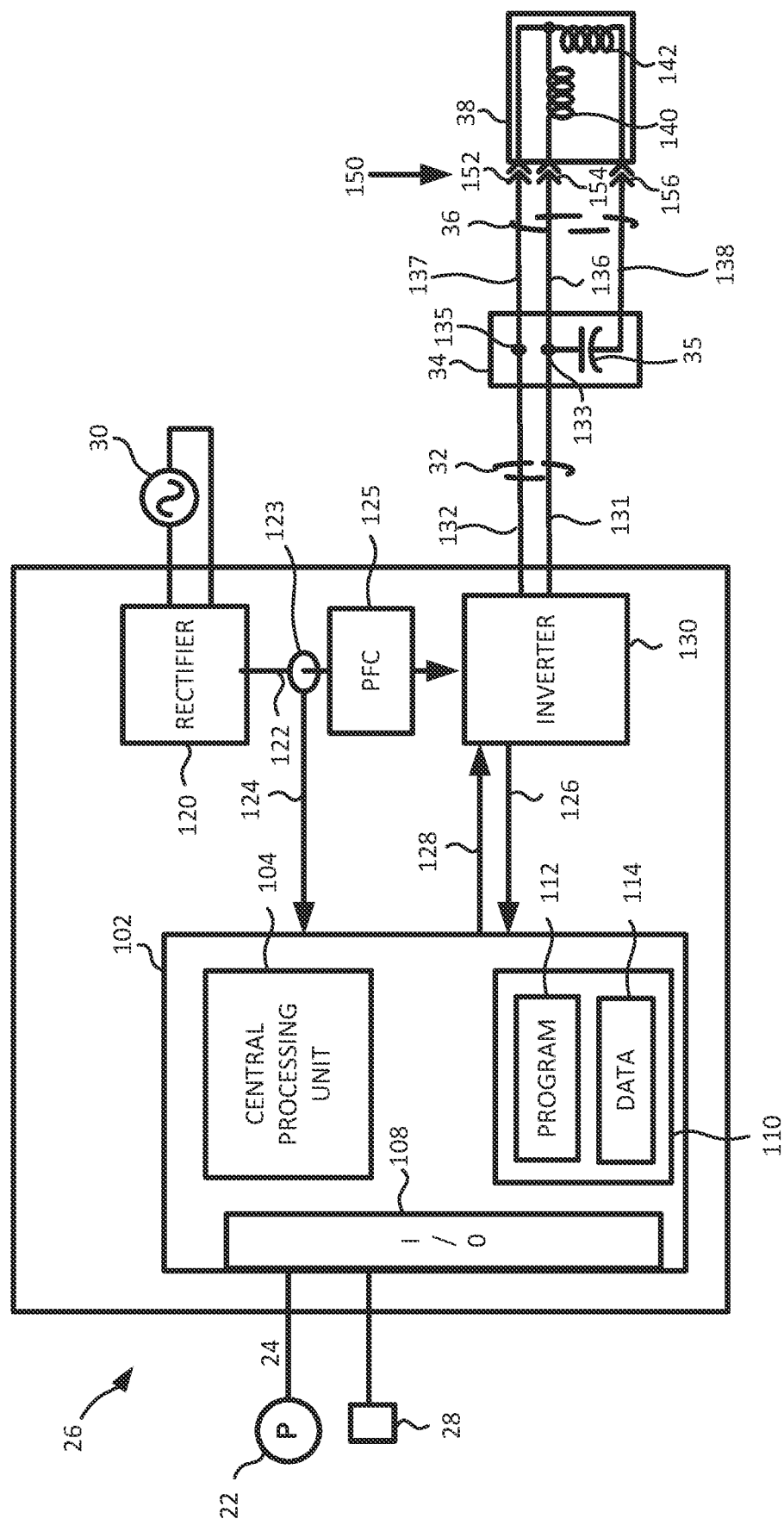
FIG. 10 is a schematic view of a motor drive showing the motor and the capacitor assembly.

Referring to FIG. 10, cables 32 and 36 are connected to capacitor 35 in capacitor assembly 34. The electrical connections between the sections are enclosed by the cover. Electrical connections with cables 32 and 36 can also be enclosed by the cover. The cover can be injection molded over the sections and the electrical connections in a one-piece structure including ends of cables 32 and 36 and capacitor 35. A conventional motor connector is included at the motor end of cable 36.

Motor 38 can be connected to a 3-wire cable without capacitor assembly 34. Including capacitor assembly 34 provides installation flexibility, whereby initial wire (copper) costs are reduced in the embodiments including capacitor assembly 34, due to use of only two wires in cable 32, but if desired the same motor can be used with a 3-wire control configuration, in which an above-ground capacitor is used instead of capacitor assembly 34, reducing the need to stock multiple motor types in inventory.

In some embodiments, as shown in FIG. 5, the ends of capacitor assembly 34 are attached to each other to secure capacitor assembly 34 around the drop pipe.

Cover 60 may comprise a polymer overmolded over the capacitor sections. The polymer may comprise synthetic rubber. A low-pressure injection molding process may be employed to enclose capacitor 35.

In another embodiment, an arcuate capacitor is provided. The arc defined by the inner surface (the drop pipe facing surface) of the capacitor can be less or more than 180 degrees. In one example, the capacitor is tubular, and the arc equals 360 degrees. The ends may be connected together. The tubular capacitor defines an internal volume sized to receive the drop pipe therethrough. Unlike the flexible capacitor assembly, which can be wrapped around the drop pipe, the tubular capacitor is placed over one end of the drop pipe. In another example, the arc is less than 360 degrees.

In some embodiments, capacitor 35 is shaped in an arcuate shape with an inner diameter configured to substantially match the outer diameter of the drop pipe. In the present embodiment the cover is not necessarily flexible. The distance between the ends of the arcuate capacitor is equal to or greater than the diameter of the drop pipe, to enable mounting of the arcuate capacitor onto the drop pipe without placing it over one end of the drop pipe. In one variation of the preceding example, the distance between the ends of the arcuate capacitor is about equal to the diameter of the drop pipe. In one variation of the preceding example, a second arcuate portion is provided which is attached to the arcuate capacitor to secure the capacitor in place around the drop pipe. The previously disclosed strapping mechanisms may be used to secure the arcuate capacitor around the drop pipe. The two arcuate portions are electrically connected by one or more cables.

It should be understood that the lengths of cables 32 and 36 depicted in the figures are exemplary and other lengths are also suitable.

Returning to FIG. 10, an embodiment of motor drive 26 comprising a controller 102, a rectifier 120, an optional power factor correction circuit (PFC) 125, and an inverter 130 is shown. As shown, controller 102 includes a CPU 104 configured to access a memory device 110 and execute processing instructions from a software application, exemplified by program 112, based on data 114. Techniques for generating motor voltages according to characteristics of a control voltage are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the motor drive looks up a voltage corresponding to the frequency. The motor drive then generates a motor voltage based on the voltage and the frequency. In another example, a formula or a function embodying the operating curve characteristics is used by CPU 104 to generate the desired motor voltages.

Rectifier 120 is powered by a power source 30 and includes any rectification circuit well known in the art, e.g. a diode bridge, to convert alternating-current (AC) voltage supplied by power source 30 into direct-current (DC) voltage which it supplies to inverter 130. Inverter 130 receives DC power from rectifier 120 through a conductor 122 and converts the DC power into an AC motor power. Current drawn by inverter 130 from rectifier 120 is sensed by a current sensor 123 and a current signal is provided by current sensor 123 to CPU 104 by conductor 124. Motor voltage feedback can also be provided, for example through conductor 126 connecting inverter 130 and controller 102. CPU 104 receives inputs through an I/O interface 108 and outputs a control voltage over line 128 to inverter 130. In one example, the control voltage is provided to a pulse-width-modulated (PWM) module having power switches and control logic which generates the appropriate gating signals for the power switches to convert the DC power supplied by rectifier 120 to the AC motor voltage suitable to drive motor 38 according to the control voltage. Motor voltages may also be generated with other known or later developed drive topologies programmed in accordance with embodiments of the disclosure.

The motor voltage is supplied to motor 38 via conductors 131, 132 of cable 32 and conductors 136-138 of cable 36. Conductor 131 is connected to conductor 136 at a first connection 133. Conductor 132 is connected to conductor 137 at a second connection 135. A connector 150 terminates cable 36 and includes a node connector 152, a main winding connector 154, and a start winding connector 156. Conductor 137 is connected via node connector 152 to a node connecting main winding 140 and start winding 142. Conductor 136 is connected via connection 133 to the input side of capacitor 35 and via a main winding connector 154 to the input side of main winding 140. Conductor 138 is connected to the output side of capacitor 35 and via a start winding connector 156 to the input side of start winding 142. Cable 32 may be referred to as a power cable, comprising a first electrical conductor (conductor 131) and a second electrical conductor (conductor 132); cable 34 may be referred to as a motor cable comprising a first electrical conductor (conductor 136), a second electrical conductor (conductor 137), and a third electrical conductor (conductor 138), the first electrical conductor of the motor cable connected to the first electrical conductor of the power cable at first connection 133, and the second electrical conductor of the power cable electrically connected to the motor via the second electrical conductor of the power cable, optionally via connection 135. Capacitor 35 has a power electrical end connected to the first electrical conductors of the power cable and the motor cable at first connection 133. The motor electrical end is electrically connected to the third electrical conductor. The connection can be mechanical and be enclosed by the cover, potentially outside of a capacitor section housing. The motor cable may be longer than a length of the pump to reach from the capacitor assembly, which is mounted to the drop pipe above the pump, to the motor, which is below the pump.

In another embodiment, the motor drive comprises a contactor and the motor is operated at a constant speed instead of a variable speed.

In a more general embodiment, the controller comprises control logic operable to generate the control voltage. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 13:
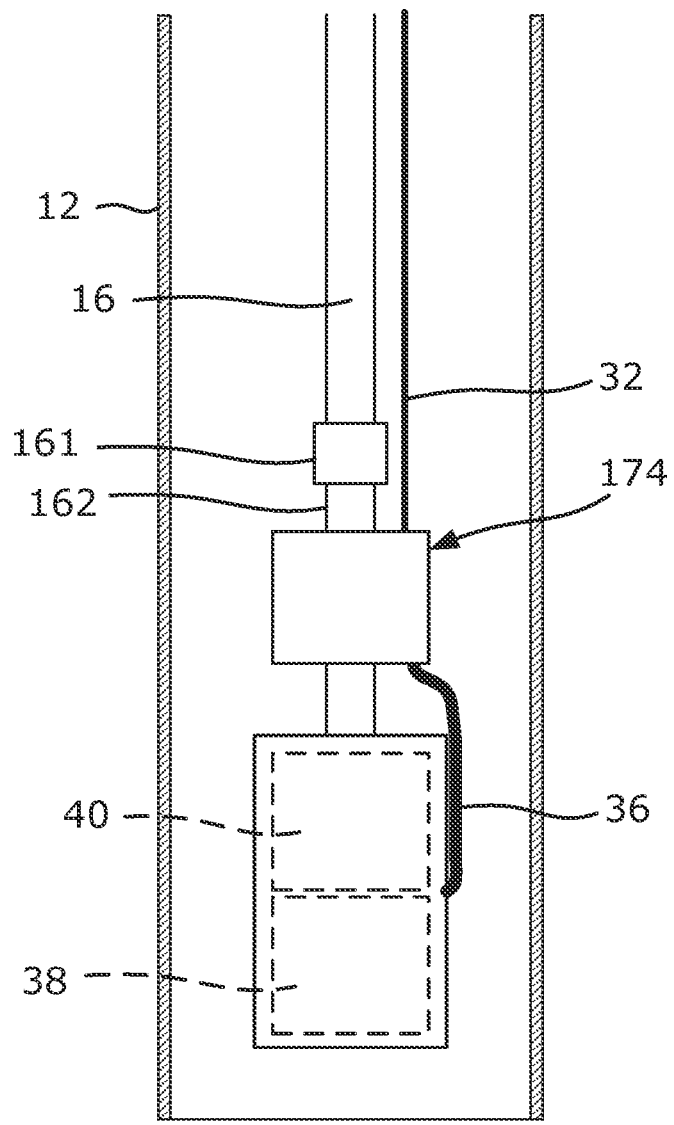
FIG. 13 is a sectioned plan view of a variation of the embodiments of the components depicted in FIGS. 11 and 12.

FIGS. 11 and 12 are sectioned plan and elevation views of a further embodiment of a capacitor assembly, denoted by numeral 174, including a cover 176, a capacitor 35 comprising one or more capacitor sections 178 (e.g. a capacitor pack), and a pipe section 162. During installation, pipe section 162 is connected to drop pipe 16 and a pipe section 164 which is connected to pump 40. FIG. 13 illustrates a variation of the present embodiment in which pipe section 162 is connected to pump 40 without pipe section 164. Coupling collars 161, 163 can be used to connect the drop pipe and the pipe sections as is known in the art. Pipe section 164 may be a variable length pipe section. Cable 36 may be wrapped around the variable length pipe section to facilitate extension or reduction of the length. The cover may comprise rubber and may encapsulate the capacitor and a portion of pipe section 162. The cover may encapsulate the capacitor, then the pipe section can be passed through the center of the capacitor and bonded to it. Bonding may be by vulcanizing the rubber. Alternatively, the pipe section is assembled with the capacitor and then the cover is formed over the combination.

To install capacitor assembly 174, pipe section 164 is connected to the pump and capacitor assembly 174 is connected between pipe section 164 and drop pipe 16. Cable 36 is then connected to the motor. In another variation, applicable to the present embodiment and the embodiments hereinabove, cable 32 and/or cable 36 may be short and comprise cable ends that extend outside the cover sufficiently (e.g. pig tails) to facilitate connection (e.g. splicing) to a drop cable and motor cable. The connections can comprise sealed connectors. The sealed connectors can form the connections outside of the cover.

Additional embodiments:

1. A cable assembly for use with a pump-motor assembly to pump a fluid through a drop pipe, the cable assembly comprising: a drive end opposite a motor end; a motor connector at the motor end, the motor connector having a main winding connector, a start winding connector, and a node connector; a main winding conductor electrically connecting the drive end to the main winding connector; a node conductor electrically connecting the drive end to the node connector; and a capacitor having an annular shape and being connected between the main winding conductor and the start winding connector.

2. The cable assembly of embodiment 1, wherein the capacitor comprises capacitor sections encapsulated by a cover having flexible portions between the capacitor sections, the capacitor and the cover forming a flexible capacitor assembly adapted to be wrapped around the drop pipe.

3. The cable assembly of embodiment 1, wherein the capacitor has a tubular shape defining a cylindrical volume sized to enable placement of the drop pipe therethrough.

4. The cable assembly of embodiment 1, wherein the capacitor has an arcuate shape, an arc of the capacitor defined by a drop pipe facing surface of the capacitor extending up to but less than 360 degrees.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A capacitor assembly adapted for placement adjacent a pipe provided to transfer water pumped with a pump, the capacitor assembly comprising:
    a power cable comprising a first electrical conductor and a second electrical conductor;
    a motor cable comprising a first electrical conductor, a second electrical conductor, and a third electrical conductor, the first electrical conductor of the motor cable electrically connected to the first electrical conductor of the power cable, and the second electrical conductor of the motor cable electrically connected to the second electrical conductor of the power cable;
    a capacitor connected to the first electrical conductors of the power cable and the motor cable and to the third electrical conductor; and
    a cover enclosing the capacitor, ends of the first conductors of the power cable and the motor cable connected to the capacitor, and an end of the third conductor connected to the capacitor,
    wherein the cover is water impermeable and the capacitor assembly is configured for installation outside the motor,
    wherein after installation the capacitor assembly has an arcuate shape with a concave surface facing the pipe;
    wherein the capacitor comprises a first capacitor section electrically connected to a second capacitor section, the first capacitor section and the second capacitor section being spaced apart and flexibly coupled by a flexible connector; and
    wherein the cover is a one-piece structure formed by over-molding a polymer over the first capacitor section and the second capacitor section to surround the first capacitor section and the second capacitor section and form the flexible connector.

2. The capacitor assembly of claim 1, wherein the first electrical conductor of the motor cable is mechanically connected to the first electrical conductor of the power cable at a first connection, and the first connection is enclosed by the cover.

3. The capacitor assembly of claim 2, wherein the second electrical conductor of the motor cable is mechanically connected to the second electrical conductor of the power cable at a second connection, and the second connection is enclosed by the cover.

4. The capacitor assembly of claim 2, wherein the second electrical conductor of the motor cable is integrally formed with the second electrical conductor of the power cable.

5. The capacitor assembly of claim 1, wherein the cover is sized and configured to curve around the pipe thereby adopting the arcuate shape.

6. The capacitor assembly of claim 5, wherein the capacitor sections have lengths parallel to a length of the capacitor.

7. The capacitor assembly of claim 5, wherein a maximum thickness of the capacitor along a radial direction is at most 1.35 inches.

8. The capacitor assembly of claim 1, wherein each of the first capacitor section and the second capacitor section comprises a housing and a capacitor potted in the housing.

9. The capacitor assembly of claim 8, wherein each of the first capacitor section and the second capacitor section comprises a first lead and a second lead, wherein the first lead of the first capacitor section is connected to the first conductor of the motor cable and the second lead of the first capacitor section is connected to the first lead of the second capacitor section.

10. The capacitor assembly of claim 8, wherein each of the first capacitor section and the second capacitor section comprises a first lead and a second lead, wherein the housing has a concave surface, a convex surface spaced apart from the concave surface, a left lateral wall, and a right lateral wall, the left and right lateral walls connecting the concave surface and the convex surface, wherein the first lead extends through the left lateral wall and the second lead extends through the right lateral wall.

11. The capacitor assembly of claim 1, wherein a thickness of the capacitor assembly is greater across the first capacitor section than across the flexible connector.

12. The capacitor assembly of claim 1, wherein the capacitor assembly is substantially rigid and formed in the arcuate shape.

13. A method of installing a pump, comprising:
providing the capacitor assembly of claim 1;
coupling the pipe to a discharge port of the pump;
connecting a free end of the motor cable to a motor configured to drive the pump; and
inserting the motor, the pump, and the capacitor assembly into a casing.

14. The method of claim 13, further comprising connecting a feed line or drop cable to the power cable before inserting the motor, the pump, and the capacitor assembly into the casing.

15. The method of claim 13, further comprising strapping the capacitor assembly to the pipe before inserting the motor, the pump, and the capacitor assembly into a casing.

16. The method of claim 15, wherein strapping the capacitor assembly to the drop pipe includes curving the capacitor assembly.

* * * * *